United States Patent
Murakami et al.

(10) Patent No.: US 11,052,574 B2
(45) Date of Patent: Jul. 6, 2021

(54) FIBER REINFORCED COMPOSITE MEMBER MOLDING APPARATUS

(71) Applicant: IHI CORPORATION, Koto-ku (JP)

(72) Inventors: Tsutomu Murakami, Koto-ku (JP); Kenro Obuchi, Koto-ku (JP); Shinichi Tanaka, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 415 days.

(21) Appl. No.: 16/017,234

(22) Filed: Jun. 25, 2018

(65) Prior Publication Data

US 2018/0304496 A1  Oct. 25, 2018

Related U.S. Application Data

(63) Continuation of application No. PCT/JP2016/077846, filed on Sep. 21, 2016.

(30) Foreign Application Priority Data

Jan. 20, 2016  (JP) .............................. JP2016-008969

(51) Int. Cl.
*B29C 70/34* (2006.01)
*B29C 43/52* (2006.01)
(Continued)

(52) U.S. Cl.
CPC ............ *B29C 33/06* (2013.01); *B29C 33/302* (2013.01); *B29C 33/306* (2013.01); *B29C 43/52* (2013.01);
(Continued)

(58) Field of Classification Search
None
See application file for complete search history.

(56) References Cited

U.S. PATENT DOCUMENTS

| 5,017,126 A | * | 5/1991 | Yamada | ................ B29B 13/024 |
| | | | | 264/535 |
| 5,139,407 A | * | 8/1992 | Kim | ........................ B29C 33/08 |
| | | | | 264/325 |

(Continued)

FOREIGN PATENT DOCUMENTS

| EP | 0 370 991 A2 | 11/1989 |
| JP | 10-249861 | 9/1998 |

(Continued)

OTHER PUBLICATIONS

English translation of JP 2009292054 (Year: 2009).*

(Continued)

*Primary Examiner* — Jacob T Minskey
*Assistant Examiner* — Baileigh Kate Darnell
(74) *Attorney, Agent, or Firm* — Oblon, McClelland, Maier & Neustadt, L.L.P.

(57) ABSTRACT

A fiber reinforced composite member molding apparatus includes a pair of molds for clamping prepreg formed of long carbon fibers impregnated with resin, induction heating coils for heating thermoplastic resin contained in the prepreg via the molds, and cooling passages for cooling the resin via the molds after the resin is melted, wherein the molds each have a design surface brought into contact with the layered prereg, the design surface being divided into a plurality of regions, and a plurality of cells provided along the design surface to be open at the back of the design surface and individually correspond to the regions of the design surface, the induction heating coils are arranged in the cells, and the cooling passages are formed in each of the molds to run along the design surface.

7 Claims, 8 Drawing Sheets

(51) Int. Cl.
    *B29C 33/30*      (2006.01)
    *B29C 33/06*      (2006.01)
    *B29C 43/36*      (2006.01)
    *B29C 35/16*      (2006.01)
    *B29L 31/08*      (2006.01)
    *B29C 33/02*      (2006.01)
    *B29K 105/08*      (2006.01)
    *B29C 35/08*      (2006.01)
    *B29C 33/04*      (2006.01)

(52) U.S. Cl.
    CPC ............ *B29C 70/345* (2013.01); *B29C 33/04* (2013.01); *B29C 43/36* (2013.01); *B29C 2033/023* (2013.01); *B29C 2035/0811* (2013.01); *B29C 2035/1616* (2013.01); *B29C 2035/1658* (2013.01); *B29K 2105/0872* (2013.01); *B29L 2031/08* (2013.01); *B29L 2031/087* (2013.01)

(56) References Cited

U.S. PATENT DOCUMENTS

| | | | |
|---|---|---|---|
| 5,688,426 A | * | 11/1997 | Kirkwood ........... B29C 66/7392 |
| | | | 219/633 |
| 5,829,716 A | * | 11/1998 | Kirkwood ............ B29C 66/721 |
| | | | 244/117 R |
| 2005/0034810 A1 | | 2/2005 | Yamazaki et al. |
| 2005/0179173 A1 | * | 8/2005 | Himmer .................. B29C 33/04 |
| | | | 266/111 |
| 2006/0249872 A1 | | 11/2006 | Manuel et al. |
| 2009/0170227 A1 | | 7/2009 | Yamazaki et al. |
| 2009/0291161 A1 | | 11/2009 | Kayano et al. |
| 2010/0181018 A1 | * | 7/2010 | Walczyk ................. B29C 70/44 |
| | | | 156/243 |
| 2012/0267828 A1 | | 10/2012 | Halford |

FOREIGN PATENT DOCUMENTS

| | | |
|---|---|---|
| JP | 2005-125569 | 5/2005 |
| JP | 2009-292054 | 12/2009 |
| JP | 2011-98514 | 5/2011 |
| JP | 2011-206918 | 10/2011 |
| JP | 2015-160393 A | 9/2015 |

OTHER PUBLICATIONS

International Search Report dated Nov. 29, 2016 in PCT/JP2016/077846, filed on Sep. 21, 2016 (with English Translation).
Extended European Search Report dated Jul. 31, 2019 in European Patent Application No. 16886398.3 citing documents AA-AD and AX therein, 8 pages.
Anonymous, "Thermal center—Wikipedia", Retrieved from the Internet: URL:https://en.wikipedia.org/wiki/Thermal_center, XP055608102, Feb. 26, 2019, 2 pages.

* cited by examiner

FIBER REINFORCED COMPOSITE MEMBER MOLDING APPARATUS

TECHNICAL FIELD

The present disclosure relates to a fiber reinforced composite member molding apparatus used to mold a fiber reinforced composite member, such as a composite fan blade or a composite stator vane of a turbofan engine, from stacked sheets of prepreg formed of long carbon fibers impregnated with resin.

BACKGROUND ART

In molding a thermoplastic CFRP member from stacked sheets of prepreg formed of long carbon fibers impregnated with, for example thermoplastic resin as a matrix, a molding method using an autoclave is already established. Recently, as an alternative to the molding method using an autoclave, a mold hot press molding method using a molding apparatus is being developed.

When molding a fiber reinforced composite member using the mold hot press molding method, layered prepreg, or stacked sheets of prepreg are placed between a pair of molds in the molding apparatus, and heated to or above a melting temperature (curing temperature when the matrix resin is thermosetting resin) while pressure is applied to the layered prepreg with the thermoplastic resin melted, by the pair of molds.

After the application of pressure, the thermoplastic resin is cooled via the pair of molds to a temperature at which the resulting molded article does not experience damage or deformation by opening of the molds. The fiber reinforced composite member with a desired shape is obtained this way.

In the mold hot press molding method, whether the fiber reinforced composite member exhibits the strength of the material is greatly affected by the molding temperature. It is therefore required to control the pair of molds to produce a uniform temperature distribution.

An example of conventional art molding apparatus intended for a pair of molds to produce a uniform temperature distribution in heating and cooling is disclosed in Patent Document 1. The disclosed molding apparatus includes a plurality of heaters individually associated with a plurality of regions constituting a design surface of each mold brought into contact with prepreg.

In this example, each mold has cells open at the back of the design surface and individually corresponding to the regions of the design surface, and heaters are arranged in the cells, one for one.

The heaters heat air supplied from an air source with their heating portions and blow the heated air to the back of the design surface of each mold, thereby heating the design surface. The heaters also function as coolers by blowing air to the back of the design surface of each mold with power supply to their heating portions stopped, thus without heating air.

RELATED ART DOCUMENT

Patent Document

Patent Document 1: US 2012/0267828 A1

SUMMARY OF THE DISCLOSURE

Problems to be Solved by the Disclosure

The above-described conventional art molding apparatus is formed such that the pair of molds is heated by blowing air, heated by the heaters' heating portions, to the back of the design surface of each mold. Thus, in order to produce a uniform temperature distribution over the design surface, the molds are not allowed to have a great thickness near the design surface, which makes it difficult for the molds to have sufficient rigidity.

Further, since the pair of molds is cooled by blowing air to the back of the design surface within each cell, the molds are hard to cool between the adjacent cells, resulting in a temperature difference from the centers of the cells. The solutions to these problems have been being sought for.

This disclosure is presented in view of the above problems with the conventional art. An object of the disclosure is to provide a fiber reinforced composite member molding apparatus which allows the molds to have sufficient rigidity and can produce a uniform temperature distribution not only in heating but also in cooling of the pair of molds.

Means for Solving the Problems

The present disclosure discloses a fiber reinforced composite member molding apparatus for molding a fiber reinforced composite member from stacked sheets of prepreg formed of long carbon fibers impregnated with resin, including a pair of molds provided to be brought nearer to or away from each other, heat sources to heat the resin contained in the prepreg via the molds in a clamped and pressed state with the stacked sheets of prereg clamped between the molds, and cooling passages to allow a cooling fluid to flow, thereby cooling the resin via the molds after heating of the resin contained in the prepreg, wherein the molds each have a design surface brought into contact with the stacked sheets of prereg, the design surface being divided into a plurality of regions, and a plurality of cells provided along the design surface to be open at the back of the design surface and individually correspond to the regions of the design surface, the heat sources are individually arranged in the cells, and the cooling passages are formed in each of the mold to run along the design surface.

Effects of the Disclosure

The fiber reinforced composite member molding apparatus according to this disclosure has excellent effects, i.e., it allows the molds to have sufficient rigidity and can produce a uniform temperature distribution in heating and cooling of the pair of molds.

MODE FOR CARRYING OUT THE DISCLOSURE

With reference to the accompanying drawings, an embodiment of fiber reinforced composite member molding apparatus according to this disclosure will be described below.

FIGS. 1A to 9B show an embodiment of fiber reinforced composite member molding apparatus according to this disclosure.

Figure 1A:
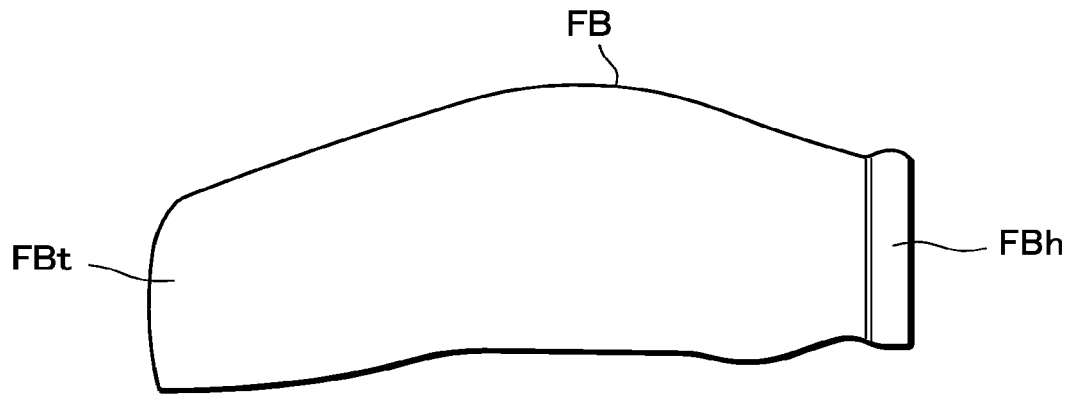
FIG. 1A is an explanatory plan view of a composite fan blade obtained with a fiber reinforced composite member molding apparatus according to this disclosure.
Figure 1B:
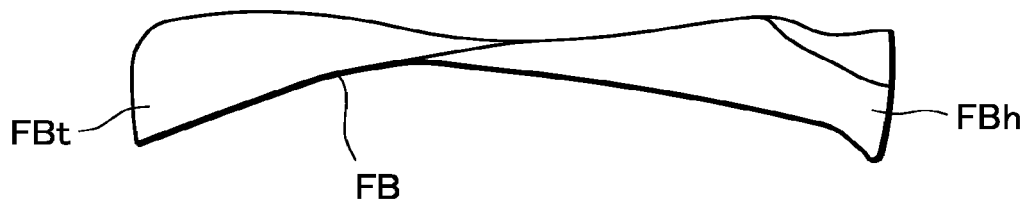
FIG. 1B is an explanatory front view of the composite fan blade obtained with the fiber reinforced composite member molding apparatus according to this disclosure.

As shown in FIGS. 1A and 1B, a fiber reinforced composite member to be molded is a composite fan blade FB of a turbofan engine with a blade tip FBt greatly twisted relative to a blade hub FBh. It is molded from a plurality of sheets of prepreg formed of long carbon fibers impregnated with resin, stacked such that sheets with differing fiber orientations form alternate layers.

Figure 2:
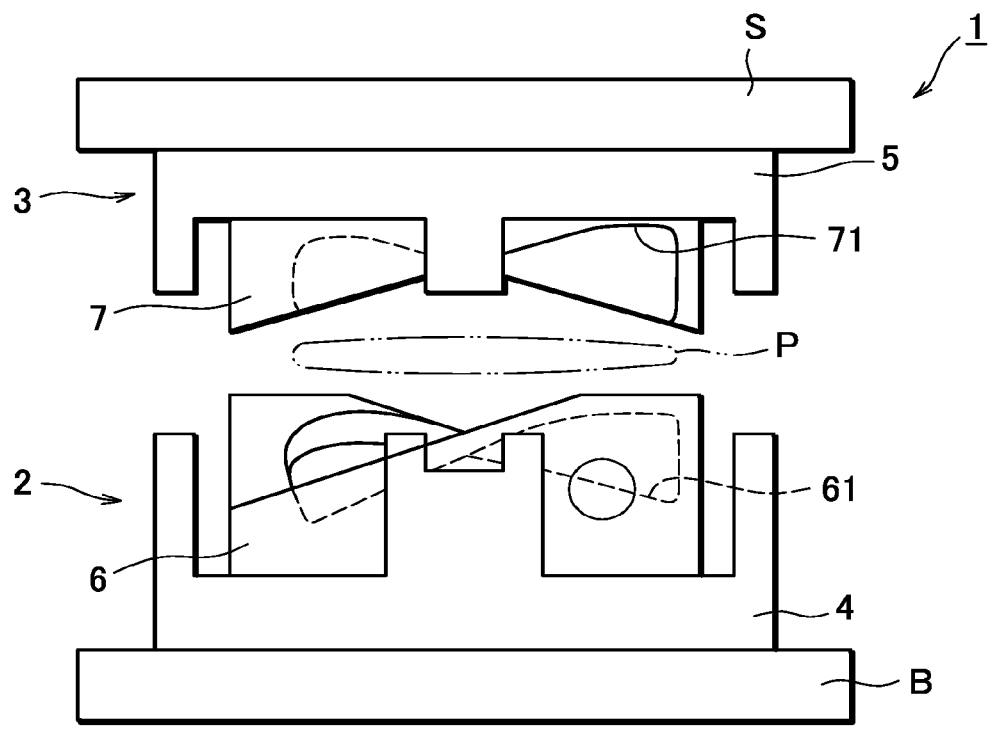
FIG. 2 is an explanatory front view showing an embodiment of fiber reinforced composite member molding apparatus according to this disclosure, in a mold open state.

As shown in FIG. 2, the fiber reinforced composite member molding apparatus 1 comprises a pair of molds 2, 3. Of the two molds 2, 3, the lower mold 2 comprises a base mold component 4 fixed onto a bolster B and a design mold component 6 detachably attached to the base mold component 4.

For the base mold component 4 of the lower mold 2, for example tool steel (SCM440) is used, and for the design mold component 6 thereof, an alloy with a low thermal expansion rate, such as invar (registered trademark), is used.

Of the two molds 2, 3, the upper mold 3 comprises a base mold component 5 fixed to a slide S moving up and down and a design mold component 7 detachably attached to the base mold component 5. In a clamped and pressed state in which pressure is applied to the molds from above and from below, the design mold component 7 clamps stacked sheets of prepreg, referred to as layered prepreg P (material to be molded into the composite fan blade FB), onto the design mold component 6 of the lower mold 2.

Also for the base mold component 5 of the upper mold 3, for example tool steel (SCM440) is used, and for the design mold component 7 thereof, an alloy with a low thermal expansion rate, such as invar (registered trademark), is used.

Figure 3A:
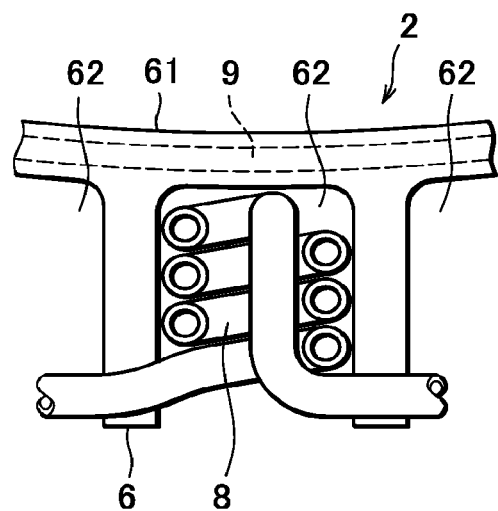
FIG. 3A is an explanatory cross-sectional fragmentary view corresponding to a part in a circle in FIG. 2 for showing an example of the manner of arranging an induction heating coil in a cell in a design mold component of a lower mold in the fiber reinforced composite member molding apparatus of FIG. 2.
Figure 3B:
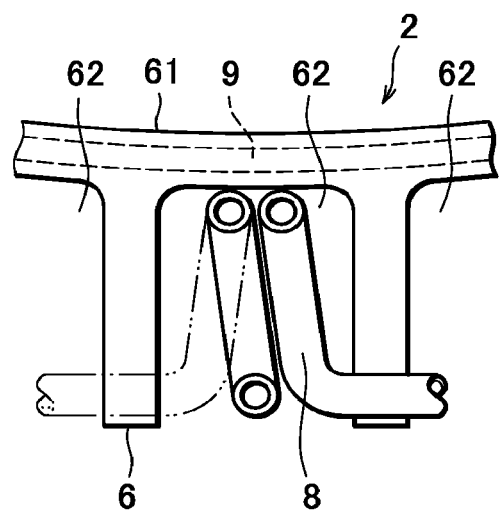
FIG. 3B is an explanatory cross-sectional fragmentary view corresponding to the part in the circle in FIG. 2 for showing another example of the manner of arranging an induction heating coil in a cell in the design mold component of the lower mold in the fiber reinforced composite member molding apparatus of FIG. 2.

As partially shown in FIG. 3A, the molding apparatus 1 comprises induction heating coils (heat sources) 8 individually heating a plurality of regions of a design surface 61 of the design mold component 6 of the lower mold 2 brought into contact with the layered prepreg P.

Specifically, the design mold component 6 of the lower mold 2 has a plurality of cells 62 provided along the design surface 61 to be open at the back of the design surface 61 and correspond to the regions of the design surface, and the induction heating coils 8 are arranged in the cells 62, one for one. The induction heating coils 62 arranged in the cells 62, one for one, are electrically connected to each other. The manner of arranging an induction heating coil 8 in each cell 62 is not limited to that shown in FIG. 3A, namely arranging the induction heating coil 8 to coil around an axis perpendicular to the design surface 61. The induction heating coil 8 may be arranged in the manner shown in FIG. 3B, namely arranged to coil around an axis running along the design surface 61. In place of the induction heating coils 8, cartridge heaters may be used as heat sources.

Figure 4A:
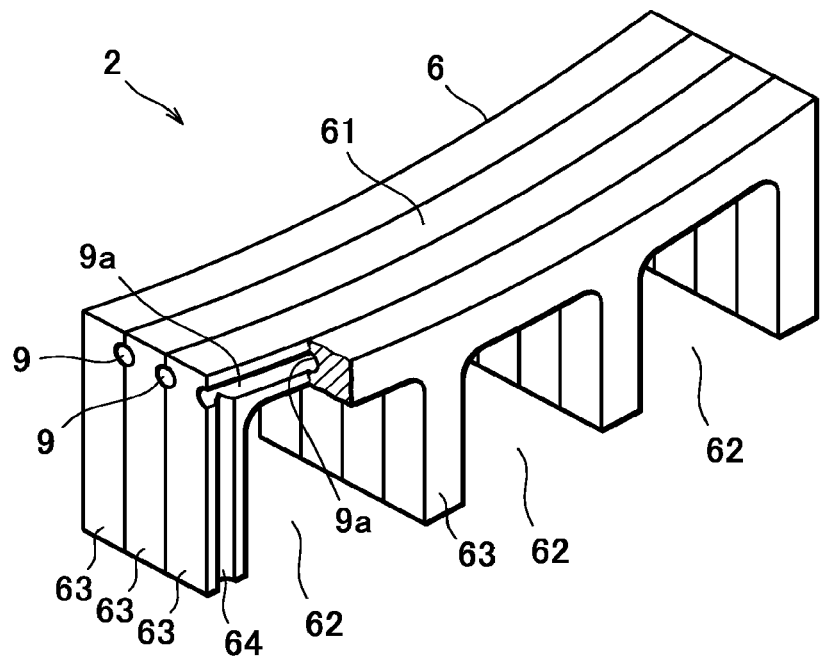
FIG. 4A is an explanatory perspective fragmentary view of the design mold component of the lower mold in the fiber reinforced composite member molding apparatus of FIG. 2 for showing cooling passages in the design mold component.
Figure 4B:
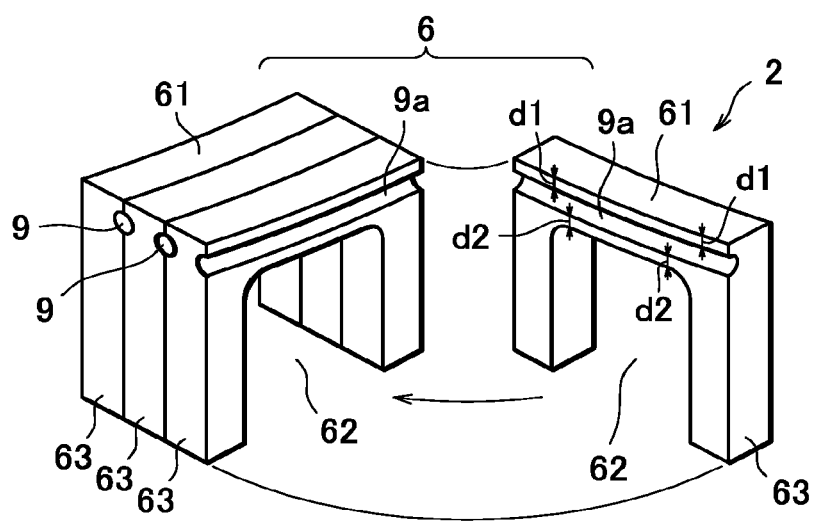
FIG. 4B is an explanatory exploded perspective view of the design mold component of the lower mold in the fiber reinforced composite member molding apparatus of FIG. 2 for showing cooling passages in the design mold component.

As shown in FIG. 4A, the molding apparatus 1 further comprises a plurality of cooling passages 9 to allow a cooling fluid to flow to cool the layered prepreg P via the design mold component 6 of the lower mold 2. For the cooling fluid, a gas such as air or a liquid such as water can be used.

In the present embodiment, as partially shown in FIG. 4A, the design mold component 6 of the lower mold 2 is formed by joining a plurality of design mold-constituting plates 63 abutting each other by diffusion bonding. Specifically, the design mold-constituting plates 63, standing in the direction in which the molds 2, 3 are brought nearer to or away from each other, are diffusion-bonded in a vacuum by applying forces to bring them into close contact with each other at a melting temperature or below.

The cooling passages 9 are each formed by cooling grooves 9a in adjacent design mold-constituting plates 63 meeting each other when the design mold-constituting plates 63 are diffusion-bonded. The cooling grooves 9a are formed in the design mold-constituting plates 63 in advance to run along the design surface 61. The distance d1 from the design surface 61 to each cooling passage 9 and the distance d2 from the cell 62 thereto are determined depending on the thickness of the layered prepreg P which differs from part to part. This means that the distance between the cooling passage 9 and the curved design surface 61 can be determined freely. In addition, the design mold component 6 can be cooled seamlessly, including the portions between the cells 62.

The cooling fluid is supplied to the cooling passages 9 through vertical holes 64, which are formed by machining after the design mold component 6 is made by diffusion bonding.

Although not shown, also the design mold component 7 of the upper mold 3 comprises a plurality of cells provided along the design surface 71 to be open at the back of the design surface 71 and correspond to a plurality of regions of the design surface, and induction heating coils 8 are arranged in the cells, one for one. Although not shown, also the design mold component 7 of the upper mold 3 is formed by joining a plurality of design mold-constituting plates by diffusion bonding, and cooling passages are formed between adjacent design mold-constituting plates to run along the design surface.

Thus, in the molding apparatus 1, thermoplastic resin contained in the layered prepreg P placed between the lower mold 2 and the upper mold 3 is heated to a melting temperature (curing temperature when the matrix resin is thermosetting resin) or above by the induction heating coils 8 arranged in the cells 62, one for one, and pressure is applied to the layered prereg P with the thermoplastic resin melted, by uniaxial pressing.

After the application of pressure, by causing the cooling fluid to flow in the cooling passages 9 in the lower mold 2 and the upper mold 3, the thermoplastic resin is cooled to a temperature at which the resulting molded article does not experience damage or deformation by opening of the molds. The composite fan blade FB is obtained this way.

Figure 5A:
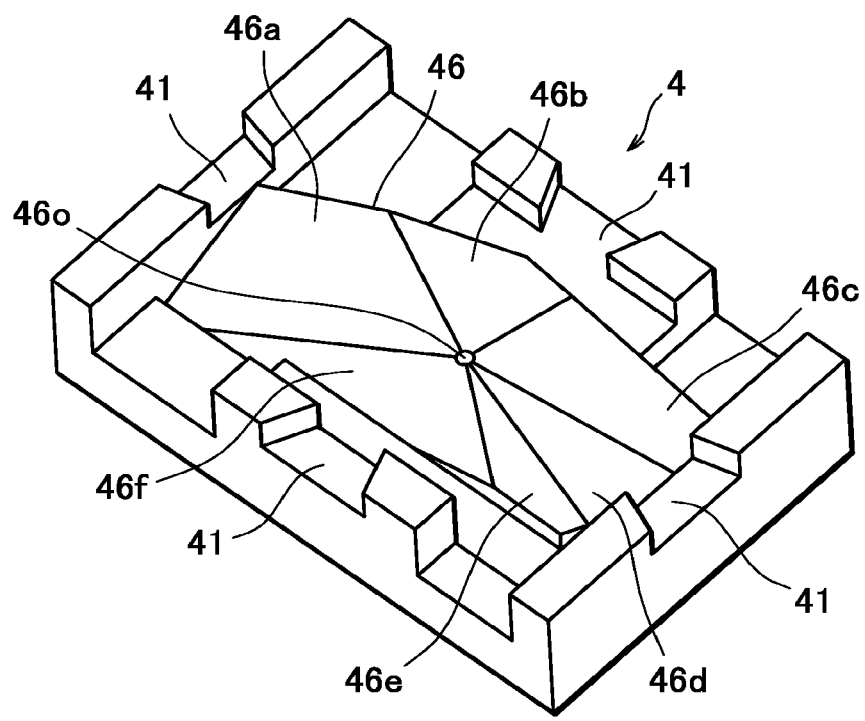
FIG. 5A is an explanatory perspective overall view showing an approximating opposing surface of a base mold component of the lower mold in the fiber reinforced composite member molding apparatus of FIG. 2.
Figure 5B:
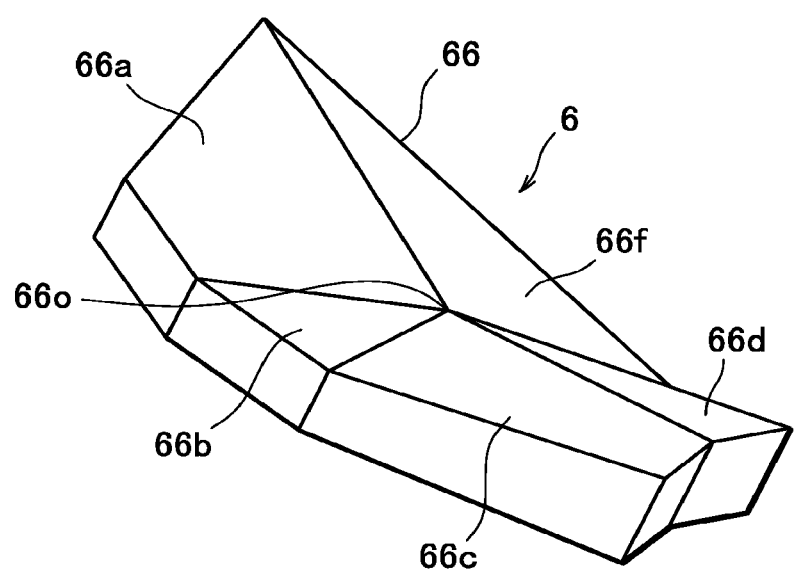
FIG. 5B is an explanatory perspective overall view showing an approximating opposing surface of the design mold component of the lower mold in the fiber reinforced composite member molding apparatus of FIG. 2.

Further, as shown in FIGS. 5A and 5B, the base mold component 4 and the design mold component 6 of the lower mold 2 in the molding apparatus 1 have a concave approximating opposing surface 46 and a convex approximating opposing surface 66, respectively. The approximating opposing surfaces are formed to approximate the design surface 61 of the design mold component 6 and adapted to be in contact with each other.

Figure 6A:
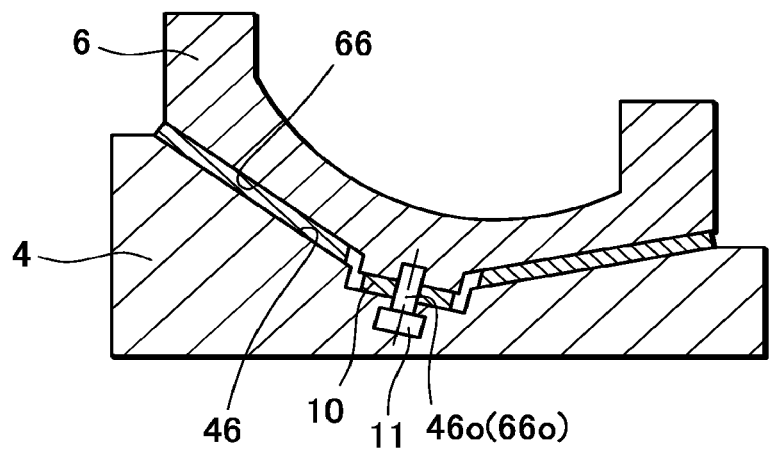
FIG. 6A is an explanatory cross-sectional view showing in what manner the approximating opposing surfaces of the base mold component and the design mold component of the lower mold, shown in FIG. 5, are in contact with each other during cooling.
Figure 6B:
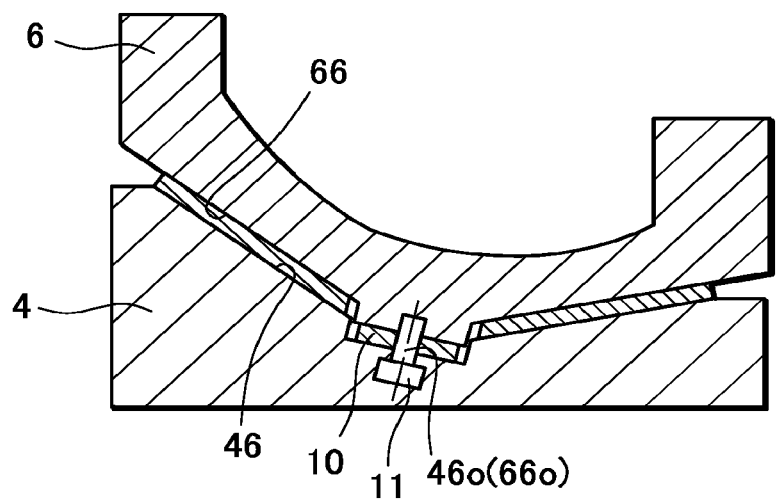
FIG. 6B is an explanatory cross-sectional view showing in what manner the approximating opposing surfaces of the base mold component and the design mold component of the lower mold, shown in FIG. 5, are in contact with each other during heating.

Here, as shown in FIGS. 6A and 6B, the base mold component 4 and the design mold component 6 are connected together with a thermal insulator 10 (ceramic thermal insulator withstanding the molding pressure, for example) interposed between them by a connecting pin 11 running through their centers 46o, 66o of thermal expansion in heating of the thermoplastic resin contained in the layered prepreg P. The approximating opposing surfaces 46, 66 are composed of a plurality of polygonal planes 46a to 46f arranged around the center 46o and a plurality of polygonal planes 66a to 66f arranged around the center 66o, respectively.

During cooling, the approximating opposing surfaces 46, 66 of the base mold component 4 and the design mold component 6 are in contact with each other. During heating, even if only the design mold component 6 with the induction heating coils 8 arranged therein experiences thermal expansion, the contact is maintained, because the approximating opposing surfaces 46, 66 are composed of the polygonal planes 46a to 46f arranged around the center 46o of thermal expansion and the polygonal planes 66a to 66f arranged around the center 66o of thermal expansion, respectively, which allows the polygonal planes 66a to 66f to be in sliding contact with the corresponding polygonal planes 46a to 46f. Thus, as shown in FIG. 6B, the contact between the approximating opposing surfaces 46, 66 is maintained. Incidentally, the connecting pin 11 for connecting the base mold component 4 and the design mold component 6 together is not indispensable, if the contact between the approximating opposing surfaces 46, 66 is satisfactorily and reliably maintained without it during heating and cooling.

Figure 7A:
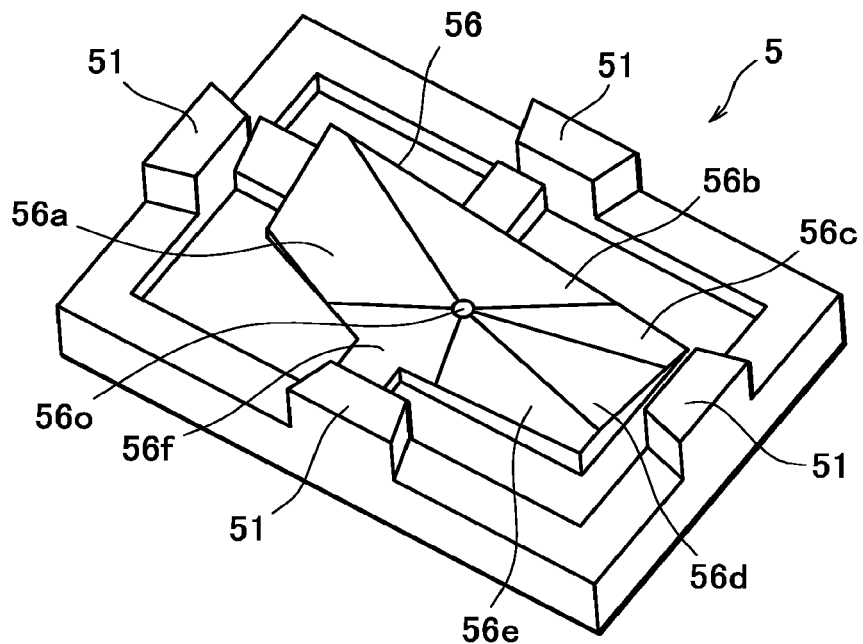
FIG. 7A is an explanatory perspective overall view showing an approximating opposing surface of a base mold component of an upper mold in the fiber reinforced composite member molding apparatus of FIG. 2.
Figure 7B:
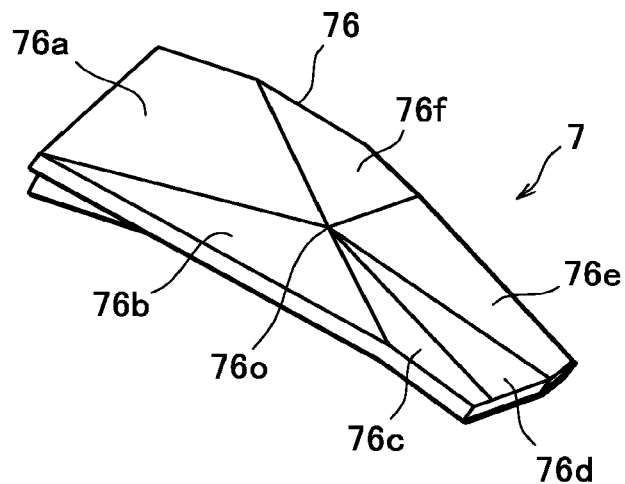
FIG. 7B is an explanatory perspective overall view showing an approximating opposing surface of a design mold component of the upper mold in the fiber reinforced composite member molding apparatus of FIG. 2.

As shown in FIGS. 7A and 7B, as is the case with the base mold component 4 and the design mold component 6 of the lower mold 2, the base mold component 5 and the design mold component 7 of the upper mold 3 have a concave approximating opposing surface 56 and a convex approximating opposing surface 76, respectively. The approximating opposing surfaces are formed to approximate the design surface 71 of the design mold component 7 and adapted to be in contact with each other. Also the approximating opposing surfaces 56, 76 are composed of a plurality of polygonal planes 56a to 56f arranged around a center 56o of thermal expansion and a plurality of polygonal planes 76a to 76f arranged around a center 76o of thermal expansion in heating of the thermoplastic resin contained in the layered prepreg P, respectively.

The base mold component 4 of the lower mold 2 in the molding apparatus 1 has dovetail grooves 41 open to the upper mold 3 side, which constitute a guide mechanism. As shown in FIG. 5A, the dovetail grooves 41 are arranged at four locations in a manner surrounding the approximating opposing surface 46.

The base mold component 5 of the upper mold 3 in the molding apparatus 1 has dovetail tenons 51 projecting to the lower mold 2 side, which, in conjunction with the dovetail grooves 41, constitutes the guide mechanism. As shown in FIG. 7A, the dovetail tenons 51 are arranged at four locations in a manner surrounding the approximating opposing surface 56.

Figure 8:
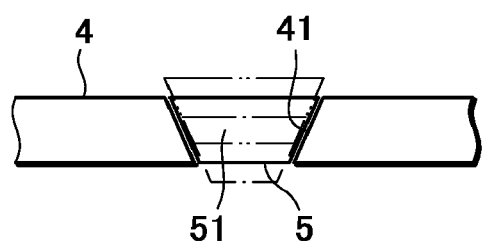
FIG. 8 is an explanatory plan fragmentary view showing a guide mechanism for the pair of molds in the fiber reinforced composite member molding apparatus of FIG. 2.

In bringing the lower mold 2 and the upper mold 3 into the clamped state, the dovetail grooves 41 of the base mold component 4 of the lower mold 2 and the dovetail tenons 51 of the base mold component 5 of the upper mold 3 guide them smoothly by engaging with each other as shown in FIG. 8.

The dovetail grooves 41 and the dovetail tenons 51 constituting the guide mechanism are provided such that even when there is a difference in the amount of thermal expansion between the base mold component 4 of the lower mold 2 and the base mold component 5 of the upper mold 3, each dovetail groove 41 and the corresponding dovetail tenon 51 can engage in a varying positional relationship, maintaining the face contact between their side walls, as indicated by chain lines and two-dot chain lines in FIG. 8, thereby absorbing the difference in the amount of thermal expansion.

Figure 9A:
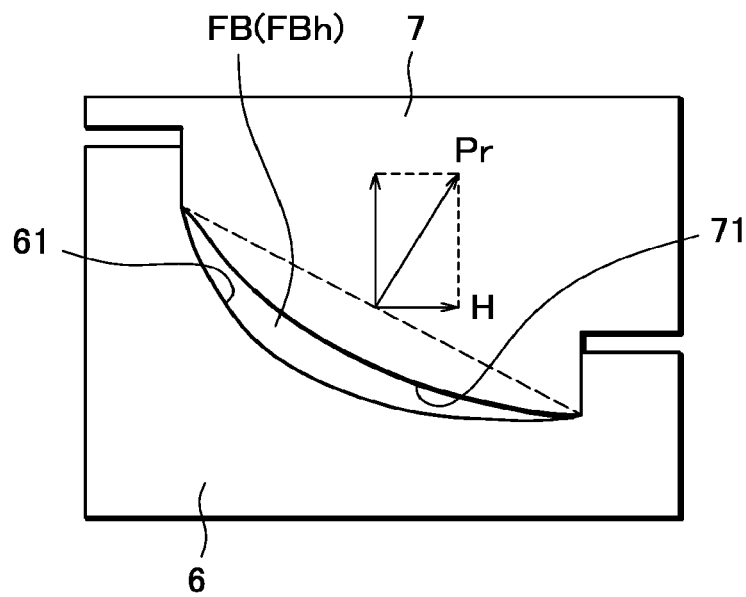
FIG. 9A is an explanatory diagram showing how a load acts on a tip of a composite fan blade when the molds are clamped and pressed in the fiber reinforced composite member molding apparatus of FIG. 2.
Figure 9B:
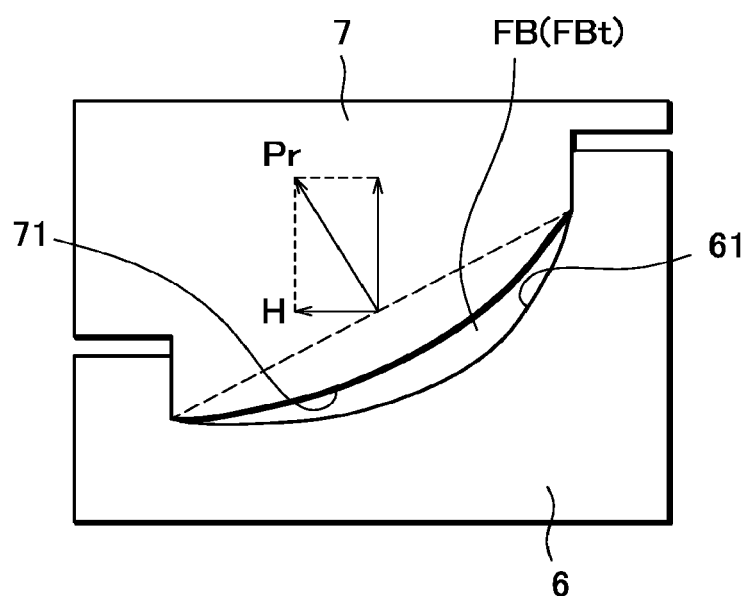
FIG. 9B is an explanatory diagram showing how a load acts on a hub of the composite fan blade when the molds are clamped and pressed in the fiber reinforced composite member molding apparatus of FIG. 2.

Here, in the pressed state in which the lower mold 2 and the upper mold 3 are clamped together and pressure is applied from above and from below, since the composite fan blade FB is greatly twisted, a horizontal component H of resin pressure Pr acts on the hub FBh and the tip FBt in opposite directions, as shown in FIGS. 9A and 9B. Thus, in the present embodiment, a fixed point is set at a point which does not produce unbalance between the horizontal components H acting on the hub FBh and the tip FBt, and the centers 46o, 66o (56o, 76o) of thermal expansion are determined based on the fixed point.

Next, a summary of how to mold a composite fan blade FB with the molding apparatus 1 will be given.

First, the design mold component 6 is connected to the base mold component 4 of the lower mold 2 by means of the connecting pin 11, wherein the approximating opposing surfaces 46, 66 of the base mold component 4 and the design mold component 6 of the lower mold 2 come into contact with each other, so that the design mold component 6 is stably attached to the base mold component 4.

Next, the design mold component 7 is connected to the base mold component 5 of the upper mold 3, wherein the approximating opposing surfaces 56, 76 of the base mold component 5 and the design mold component 7 of the upper mold 3 come into contact with each other, so that the design mold component 7 is stably attached to the base mold component 5.

After the molds 2, 3 are prepared, layered prepreg P, or stacked sheets of prepreg are set on the design mold component 6 of the lower mold 2 in a mold open state.

Then, the upper mold 3 is moved down with the slider S to bring the two molds into the clamped and pressed state, wherein the layered prepreg P is clamped between the design mold component 7 of the upper mold 3 and the design mold component 6 of the lower mold 2.

Here, the upper mold is guided smoothly by the dovetail tenons 51 of the base mold component 5 of the upper mold 3 engaging with the dovetail grooves 41 of the base mold component 4 of the lower mold 2.

Then, heat is applied to the layered prepreg P by the induction coils 8 via the design mold component 6 and the design mold component 7 while pressure is applied to the layered prepreg P with the thermoplastic resin melted by the upper mold 3 and the lower mold 2.

Here, since the induction heating coils 8 are arranged in the cells 62 provided along the design surface 61 of the design mold component 6 of the lower mold 2 to be open at the back of the design surface 61, one for one, the design mold component 6 of the lower mold 2 produces a uniform temperature distribution in heating. The design mold component 7 of the upper mold 3 has induction heating coils 8 arranged in the same manner as in the lower mold 2, and thus, the design mold component 7 of the upper mold 3 produces a uniform temperature distribution in heating.

During heating, if only the design mold component 6 with the induction heating coils 8 provided therein experiences thermal expansion, the contact between the approximating opposing surfaces 46, 66 of the base mold component 4 and the design mold component 6 is maintained, because they are composed of the polygonal plane 46a to 46f arranged around the center 46o of thermal expansion and the polygonal plane 66a to 66f arranged around the center 66o of thermal expansion, respectively, which allows the polygonal planes 66a to 66f to be in sliding contact with the corresponding polygonal planes 46a to 46f. In other words, production of a space between the approximating opposing surfaces 46, 66 of the base mold component 4 and the design mold component 6 is avoided.

Further, if, in heating, there is a difference in the amount of thermal expansion between the base mold component 4 of the lower mold 2 and the base mold component 5 of the upper mold 3, the dovetail grooves 41 and the dovetail tenons 51, which constitute a guide mechanism, engage in a varying positional relationship, as indicated by chain lines and two-dot chain lines in FIG. 8, thereby absorbing the difference in the amount of thermal expansion.

After the application of pressure, power supply to the induction heating coils 8 is stopped, and the cooling fluid is caused to flow in the cooling passages 9 in the design mold component 7 of the upper mold 3 and the design mold component 6 of the lower mold 2 to cool the thermoplastic resin via the design mold components 6, 7 to solidify it. Consequently, the article molded from the layered prepreg P, namely composite fan blade FB is obtained.

In the molding apparatus 1, in heating, the design mold component 6 of the lower mold 2 produces a uniform temperature distribution, because the induction heating coils 8 are arranged in the cells 62 provided along the design surface 61 of the design mold component 6 of the lower mold 2 to be open at the back of the design surface 61, one for one (the same holds true for the upper mold 3).

In addition, in the molding apparatus 1, the induction heating coils 8 provided as heat sources directly heat the lower mold 2, which allows the design mold components 6, 7 of the molds 2, 3 to have an increased thickness near the design surfaces 61, 71 as compared with indirect heating in the conventional art, wherein the molds are heated by blowing air heated by heating portions of heaters to the back of the design surfaces of the molds, and thus, allows the design mold components 6, 7 to have an accordingly-increased, sufficient rigidity.

In the molding apparatus 1, the design mold component 6 of the lower mold 2 has cooling passages 9 running along the design surface 61. This makes it possible to cool the design mold component 6 not only at every point (cell 62) but also between points (between adjacent cells 62), thereby producing a uniform temperature distribution in cooling.

Here, the design mold component 6 of the lower mold 2 is formed by joining a plurality of design mold-constituting plates 63 abutting each other by diffusion bonding, wherein the cooling passages 9 in the design mold component 6 are each formed by cooling grooves 9a in adjacent design mold-constituting plates 63 meeting each other. The cooling grooves 9a are formed in the design mold-constituting plates 63 in advance to run along the design surface 61. This makes it possible to give a constant distance between the cooling passage 9 and the design surface 61 or vary the distance between them depending on the thickness of the layered prepreg P which varies from part to part. This also makes it possible to construct a three-dimensional cooling circuit.

When pressure is applied to the layered prepreg P by the upper mold 3 and the lower mold 2, forces tending to cause lateral movement and forces tending to cause rotation act on the upper mold 3 or the lower mold 2. It is therefore favorable that the dovetail grooves 41 and the dovetail tenons 51 constituting the guide mechanism be formed to cancel out such forces.

The embodiment has been described based on an example in which the fiber reinforced composite member molding apparatus according to this disclosure is adapted to mold a composite fan blade FB of a turbofan engine having a great angle of twist. The fiber reinforced composite member molding apparatus according to this disclosure is however not limited to this example.

Figure 10:
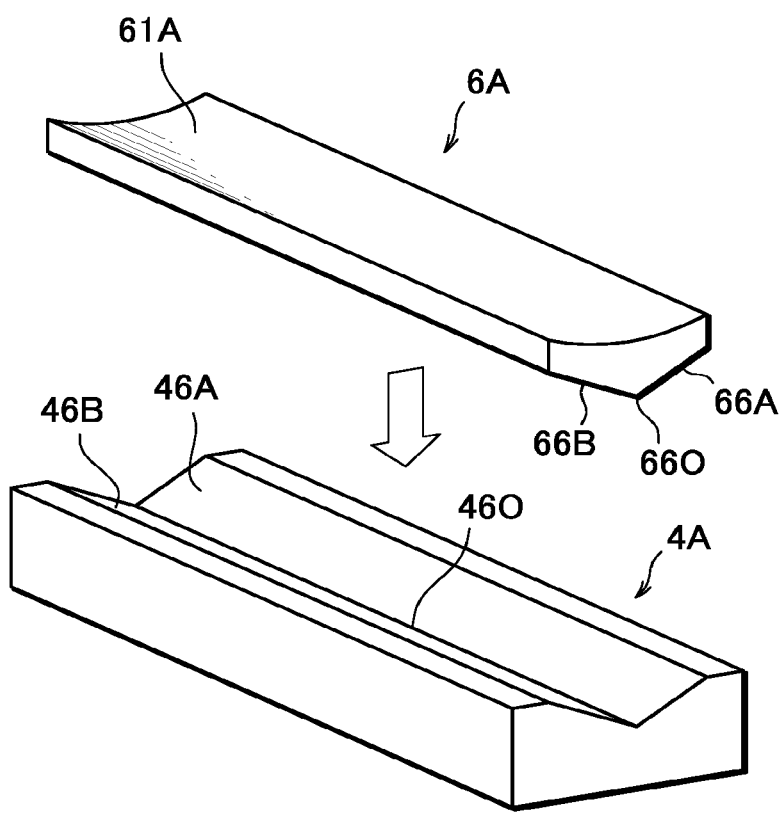
FIG. 10 is an explanatory exploded perspective view schematically showing a base mold component and a design mold component of a lower mold in another embodiment of fiber reinforced composite member molding apparatus according to this disclosure.

For example, the fiber reinforced composite member molding apparatus according to this disclosure can be adapted to mold a composite stator vane of a turbofan engine, wherein a pair of molds each comprise a base mold component 4A and a design mold component 6A as partially shown in FIG. 10, wherein the base mold component 4A and the design mold component 6A have approximating opposing surfaces formed to approximate a design surface 61A and composed of rectangular planes 46A, 46B arranged to opposite sides of a centerline 460 of thermal expansion and abutting each other and rectangular planes 66A, 66B arranged to opposite sides of a centerline 660 of thermal expansion and abutting each other, respectively.

In the fiber reinforced composite member molding apparatus disclosed herein, resins usable as a matrix to form prepreg include thermoplastic resins such as PEEK (polyether ether ketone resin), PEI (polyetherimide resin) and PIXA (thermoplastic polyimide resin), and thermosetting resins such as epoxy resin, phenol resin and polyimide resin.

A first aspect according to this disclosure is a fiber reinforced composite member molding apparatus for molding a fiber reinforced composite member from stacked sheets of prepreg formed of long carbon fibers impregnated with resin, comprising a pair of molds provided to be brought nearer to or away from each other, heat sources to heat the resin contained in the prepreg via the molds in a clamped and pressed state with the stacked sheets of prepreg clamped between the molds, and cooling passages to allow a cooling fluid to flow, thereby cooling the resin via the molds after heating of the resin contained in the prepreg, wherein the molds each have a design surface brought into contact with the stacked sheets of prereg, the design surface being divided into a plurality of regions, and a plurality of cells provided along the design surface to be open at the back of the design surface and individually correspond to the regions of the design surface, the heat sources are individually arranged in the cells, and the cooling passages are formed in each of the molds to run along the design surface.

In the fiber reinforce composite member molding apparatus according to the first aspect in this disclosure, heat sources are arranged in the cells provided along the design surface of each of the molds to be open at the back of the design surface, one for one, and cooling passages are provided to run along the design surface of each of the molds. This makes it possible to produce a uniform temperature distribution in heating and cooling of the molds.

In heating of the molds, the molds are heated directly by the heat sources, which allows the molds to have an increased thickness near the design surface as compared with indirect heating in the conventional art, wherein the molds are heated by blowing air heated by heating portions of heaters to the back of the design surface of each mold, and thus, allow the molds to have an accordingly-increased, sufficient rigidity.

In a second aspect according to this disclosure, the molds each comprise a base mold component and a design mold component providing the design surface and detachably attached to the base mold component with a thermal insulator interposed therebetween, the design mold component of each of the molds is formed by joining a plurality of design mold-constituting plates, arranged to abut each other in a position standing in the direction in which the molds are brought nearer to or away from each other, by diffusion bonding, and the design mold-constituting plates have cooling grooves provided such that the cooling grooves in adjacent design mold-constituting plates meet each other to form the cooling passages.

In the fiber reinforced composite member molding apparatus according to the second aspect in this disclosure, when the design mold component of the mold is formed by joining the design mold-constituting plates abutting each other by diffusion bonding, the cooling passages are formed by cooling grooves in adjacent design mold-constituting plates meeting each other, wherein the cooling grooves are formed in the design mold-constituting plates in advance to run along the design surface. This makes it possible to give a constant distance between the cooling passage and the design surface or vary the distance between them depending on the thickness of the stacked sheets of prepreg which varies from part to part. This also makes it possible to construct a three-dimensional cooling circuit.

In a third aspect according to this disclosure, the base mold component and the design mold component of each of the molds have approximating opposing surfaces formed to approximate the design surface, the approximating opposing surfaces of the base mold component and the design mold component each comprising a plurality of polygonal planes arranged around a center of thermal expansion in heating of the resin contained in the prepreg and abutting each other.

In the fiber reinforced composite member molding apparatus according to the third aspect in this disclosure, the approximating opposing surfaces of the base mold component and the design mold component of each of the molds, which are in contact with each other during cooling, maintain the contact even if only the design mold component experiences thermal expansion during heating, because the polygonal planes of the design mold component arranged around the center of thermal expansion are in sliding contact with the corresponding polygonal planes of the base mold component.

In a fourth aspect according to this disclosure, the base mold component and the design mold component are connected together by a connecting member running through their centers of thermal expansion.

In the fiber reinforced composite member molding apparatus according to the fourth aspect in this disclosure, the contact between the approximating opposing surfaces of the base mold component and the design mold component is maintained satisfactorily and reliably in heating and cooling.

In fifth to seventh aspects according to this disclosure, the base mold components of the molds have a guide mechanism for guiding the molds in movement relative to each other and absorbing a difference in the amount of thermal expansion between the molds.

In the fiber reinforced composite member molding apparatus according to any of the fifth to seventh aspects in this disclosure, when the molds are brought into the clamped state, the guide mechanism smoothly guides the molds, and when there is a difference in the amount of thermal expansion between the molds, the guide mechanism absorbs the difference in the amount of thermal expansion.

In an eighth aspect according to this disclosure, the base mold component and the design mold component of each of the molds have approximating opposing surfaces formed to approximate the design surface, the approximating opposing surfaces of the base mold component and the design mold component each comprising a plurality of rectangular planes arranged to opposite sides of a centerline of thermal expansion in heating of the resin contained in the prepreg and abutting each other.

In the fiber reinforced composite member molding apparatus according to the eighth aspect in this disclosure, the approximating opposing surfaces of the base mold component and the design mold component of each of the molds, which are in contact with each other during cooling, maintain the contact even if only the design mold component experiences thermal expansion during heating, because the rectangular planes of the design mold component arranged to the opposite sides of the centerline of thermal expansion are in sliding contact with the corresponding rectangular planes of the base mold component.

EXPLANATION OF REFERENCE SIGNS

1 Fiber reinforced composite member molding apparatus
2 Lower mold (forming a pair of molds)
3 Upper mold (forming a pair of molds)
4, 4A, 5 Base mold component
6, 6A, 7 Design mold component
8 Induction heating coil (heat source)
9 Cooling passage
9a Cooling groove
10 Thermal insulator
11 Connecting pin (connecting member)
41 Dovetail groove (guide mechanism)
46, 56 Approximating opposing surface
46a to 46f Polygonal plane
46o, 66o Center of thermal expansion
46A, 66B Rectangular plane
46O, 66O Centerline of thermal expansion
51 Dovetail tenon (guide mechanism)
56a to 56f Polygonal plane
56o, 76o Center of thermal expansion
71, 61A, 71 Design surface
62 Cell
63 Design mold-constituting plate
64 Vertical hole
66, 76 Approximating opposing surface
66a to 66f Polygonal plane
66A, 66B Rectangular plane
76a to 76f Polygonal plane
FB Composite fan blade (fiber reinforced composite member)
P Layered prepreg (prepreg)

The invention claimed is:

1. A fiber reinforced composite member molding apparatus for molding a fiber reinforced composite member from stacked sheets of prepreg formed of carbon fibers impregnated with resin, comprising:
  a pair of molds provided to be brought nearer to or away from each other,
  heat sources to heat the resin impregnated in each of the stacked sheets of prepreg via the pair of molds in a clamped and pressed state with the stacked sheets of prepreg clamped between the pair of molds, and
  cooling passages to allow a cooling fluid to flow, thereby cooling the resin via the pair of molds after heating of the resin impregnated in each of the stacked sheets of prepreg, wherein
  the pair of molds have each a design surface brought into contact with the stacked sheets of prepreg, the design surface being divided into a plurality of regions, and a plurality of cells provided along the design surface to be open at a back of the design surface, each of the plurality of cells individually corresponding to each of the plurality of regions of the design surface,
  each of the heat sources is individually arranged in each of the plurality of cells,
  the cooling passages are formed in each of the pair of molds to run along the design surface, and
  the pair of molds each comprise a base mold component and a design mold component providing the design surface and detachably attached to the base mold component with a thermal insulator interposed therebetween, the design mold component of each of the pair of molds is formed by joining a plurality of design mold-constituting plates, arranged to abut each other in a position standing in a direction in which the molds are brought nearer to or away from each other, by diffusion bonding, and the plurality of design mold-constituting plates have cooling grooves provided such that the cooling grooves in adjacent design mold-constituting plates meet each other to form the cooling passages.

2. The fiber reinforced composite member molding apparatus according to claim 1, wherein the base mold component and the design mold component of each of the pair of molds have approximating opposing surfaces formed to approximate the design surface, the approximating opposing surfaces of the base mold component and the design mold component each comprising a plurality of polygonal planes arranged around a point and abutting each other.

3. The fiber reinforced composite member molding apparatus according to claim 2, wherein the base mold component and the design mold component are connected together by a connecting member running through the point.

4. The fiber reinforced composite member molding apparatus according to claim 3, wherein the base mold component of one of the pair of molds has dovetail grooves and the base mold component of the other of the pair of molds has dovetail tenons, the dovetail grooves and the dovetail tenons engaging with each other in a clamped state of the pair of molds.

5. The fiber reinforced composite member molding apparatus according to claim 2, wherein the base mold component of one of the pair of molds has dovetail grooves and the base mold component of the other of the pair of molds has dovetail tenons, the dovetail grooves and the dovetail tenons engaging with each other in a clamped state of the pair of molds.

6. The fiber reinforced composite member molding apparatus according to claim 1, wherein the base mold component of one of the pair of molds has dovetail grooves and the base mold component of the other of the pair of molds has dovetail tenons, the dovetail grooves and the dovetail tenons engaging with each other in a clamped state of the pair of molds.

7. The fiber reinforced composite member molding apparatus according to claim 1, wherein the base mold component and the design mold component of each of the pair of molds have approximating opposing surfaces each foiined to approximate the design surface, the approximating opposing surfaces of the base mold component and the design mold component each comprising a plurality of rectangular planes arranged to opposite sides of a centerline of thermal expansion in heating of the resin impregnated in each of the stacked sheets of prepreg and abutting each other.

* * * * *